United States Patent
Hwang et al.

(10) Patent No.: US 9,274,648 B2
(45) Date of Patent: Mar. 1, 2016

(54) METHOD OF COMPENSATING FOR EDGE COORDINATES OF TOUCH SENSING SYSTEM

(71) Applicant: LG DISPLAY CO., LTD., Seoul (KR)

(72) Inventors: Jonghee Hwang, Gyeonggi-do (KR); Kiduk Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 104 days.

(21) Appl. No.: 14/074,997

(22) Filed: Nov. 8, 2013

(65) Prior Publication Data

US 2014/0160043 A1    Jun. 12, 2014

(30) Foreign Application Priority Data

Dec. 10, 2012    (KR) .................. 10-2012-0142644

(51) Int. Cl.
*G06F 3/041* (2006.01)

(52) U.S. Cl.
CPC .................................. *G06F 3/0418* (2013.01)

(58) Field of Classification Search
CPC ... G06F 3/0488; G06F 3/04883; G06F 3/044; G06F 3/04886; G06F 3/045
USPC .......................................................... 345/173
See application file for complete search history.

(56) References Cited

U.S. PATENT DOCUMENTS

| | | | |
|---|---|---|---|
| 2010/0245275 A1* | 9/2010 | Tanaka | .......................... 345/173 |
| 2011/0037720 A1 | 2/2011 | Hirukawa et al. | |
| 2011/0074708 A1 | 3/2011 | Oguri | |
| 2012/0105366 A1 | 5/2012 | Lai et al. | |
| 2013/0057493 A1 | 3/2013 | Hwang et al. | |

FOREIGN PATENT DOCUMENTS

| | | |
|---|---|---|
| JP | H08-292839 A | 11/1996 |
| JP | 2010-003307 A | 1/2010 |
| JP | 2011-070544 A | 4/2011 |
| TW | 201218055 A | 5/2012 |

OTHER PUBLICATIONS

Japanese Office Action dated Nov. 18, 2014, for corresponding Japanese Patent Application No. 2013-253213.
Examiner's remarks dated Oct. 22, 2015 from the Taiwan Advance Patent & Trademark Office in counterpart Taiwanese Application No. 102144959.

* cited by examiner

*Primary Examiner* — Lixi C Simpson
*Assistant Examiner* — Ngan Pham Lu
(74) *Attorney, Agent, or Firm* — Morgan, Lewis & Bockius LLP

(57) ABSTRACT

A method of compensating for coordinates of an edge portion of a touch sensing system is disclosed. The method includes calculating coordinates of a touch point, suitably converting the coordinates of the touch point based on a resolution of a display panel, deciding whether or not current coordinates of the touch point are present in a bezel area outside an active area of the display panel, in which an image is displayed, and when the current coordinates of the touch point are present in the bezel area, modifying the current coordinates of the touch point into edge coordinates of the active area contacting the bezel area.

5 Claims, 11 Drawing Sheets

○ Previous touch point (x1,y1)
✗ Current touch point (x2,y2)

Bezel
AA (a)　　　　　　　　　(b)

○ Previous touch point(x1,y1)
✕ Current touch point(x2,y2)

○ Previous touch point (x1,y1)
✕ Current touch point before compensation (x2,y2)
△ Current touch point after compensation (x3,y3)

METHOD OF COMPENSATING FOR EDGE COORDINATES OF TOUCH SENSING SYSTEM

This application claims the benefit of Korean Patent Application No. 10-2012-0142644 filed on Dec. 10, 2012, the entire contents of which is incorporated herein by reference for all purposes as if fully set forth herein.

BACKGROUND OF THE INVENTION

1. Field of the Invention

Embodiments of the invention relate to a method of compensating for coordinates of an edge portion of a touch sensing system.

2. Discussion of the Related Art

User interface (UI) is configured so that users are able to communicate with various electronic devices and thus can easily and comfortably control the electronic devices as they desire. Examples of the user interface include a keypad, a keyboard, a mouse, an on-screen display (OSD), and a remote controller having an infrared communication function or a radio frequency (RF) communication function. User interface technology has continuously expanded to increase user's sensibility and handling convenience. The user interface has been recently developed to include touch UI, voice recognition UI, 3D UI, etc.

The touch UI has been indispensably used in portable information appliances and has been expanded to the use of home appliances. A capacitive touch sensing system includes a capacitive touch screen, which has durability and definition better than an existing resistive touch screen and is able to be applied to various applications. Thus, most of the touch screens have been recently implemented as the capacitive touch screens.

The touch screen is generally disposed on a display panel of a display device. The number of touch sensors formed on the touch screen is generally less than the number of pixels of the display panel. Thus, because a resolution of the touch screen is less than a resolution of the display panel, an algorithm for matching the resolution of the touch screen to the resolution of the display panel is necessary. For example, a coordinate conversion algorithm for converting coordinates of a touch point into coordinates based on the resolution of the display panel was disclosed in U.S. Publication No. 2013/0057493 co-owned by the present assignee and which is hereby incorporated by reference in its entirety. When a touch input is generated in an edge portion between an active area, in which an image is displayed, and a bezel area corresponding to a non-display area, the coordinate conversion algorithm converts the coordinates of the touch point coordinates based on the resolution of the display panel. In this instance, the coordinates of the touch point may be present outside the active area. Even in most of known coordinate conversion algorithms other than the coordinate conversion algorithm, the coordinates of the touch point after the conversion may be present outside the active area.

SUMMARY OF THE INVENTION

Embodiments of the invention provide a method of compensating for coordinates of an edge portion of a touch sensing system capable of suitably modifying coordinates of a touch point when the coordinates of the touch point in the edge portion of a touch screen are present outside an active area.

In one aspect, there is a method of compensating for coordinates of an edge portion of a touch sensing system comprising calculating coordinates of a touch point, suitably converting the coordinates of the touch point based on a resolution of a display panel, deciding whether or not current coordinates of the touch point are present in a bezel area outside an active area of the display panel, in which an image is displayed, and when the current coordinates of the touch point are present in the bezel area, modifying the current coordinates of the touch point into edge coordinates of the active area contacting the bezel area.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

A touch sensing system according to an exemplary embodiment of the invention may be implemented as a capacitive touch screen which senses a touch input through a plurality of capacitive sensors. The capacitive touch screen includes a plurality of touch sensors. Each touch sensor has a capacitance when viewed through an equivalent circuit. The capacitive touch screen may be classified into a self capacitive touch screen and a mutual capacitive touch screen. The self capacitive touch screen is formed along conductor lines of a single layer formed in one direction. The mutual capacitive touch screen is formed between two conductor lines perpendicular to each other. The embodiment of the invention will be described using the mutual capacitive touch screen as an example of the capacitive touch screen. Because the embodiment of the invention is characterized by the correction of coordinate information of a touch point, the embodiment of the invention is not limited to the mutual capacitive touch screen. The embodiment of the invention may be applied to any touch sensing system requiring an algorithm for suitably converting coordinates of the touch point based on a resolution of a display panel.

A display device according to the embodiment of the invention may be implemented as a flat panel display, such as a liquid crystal display (LCD), a field emission display (FED), a plasma display panel (PDP), an organic light emitting display, and an electrophoresis display (EPD). In the following description, the embodiment of the invention will be described using the liquid crystal display as an example of the flat panel display, but is not limited thereto. The embodiment of the invention may be applied to all of known display devices.

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

Figure 1:
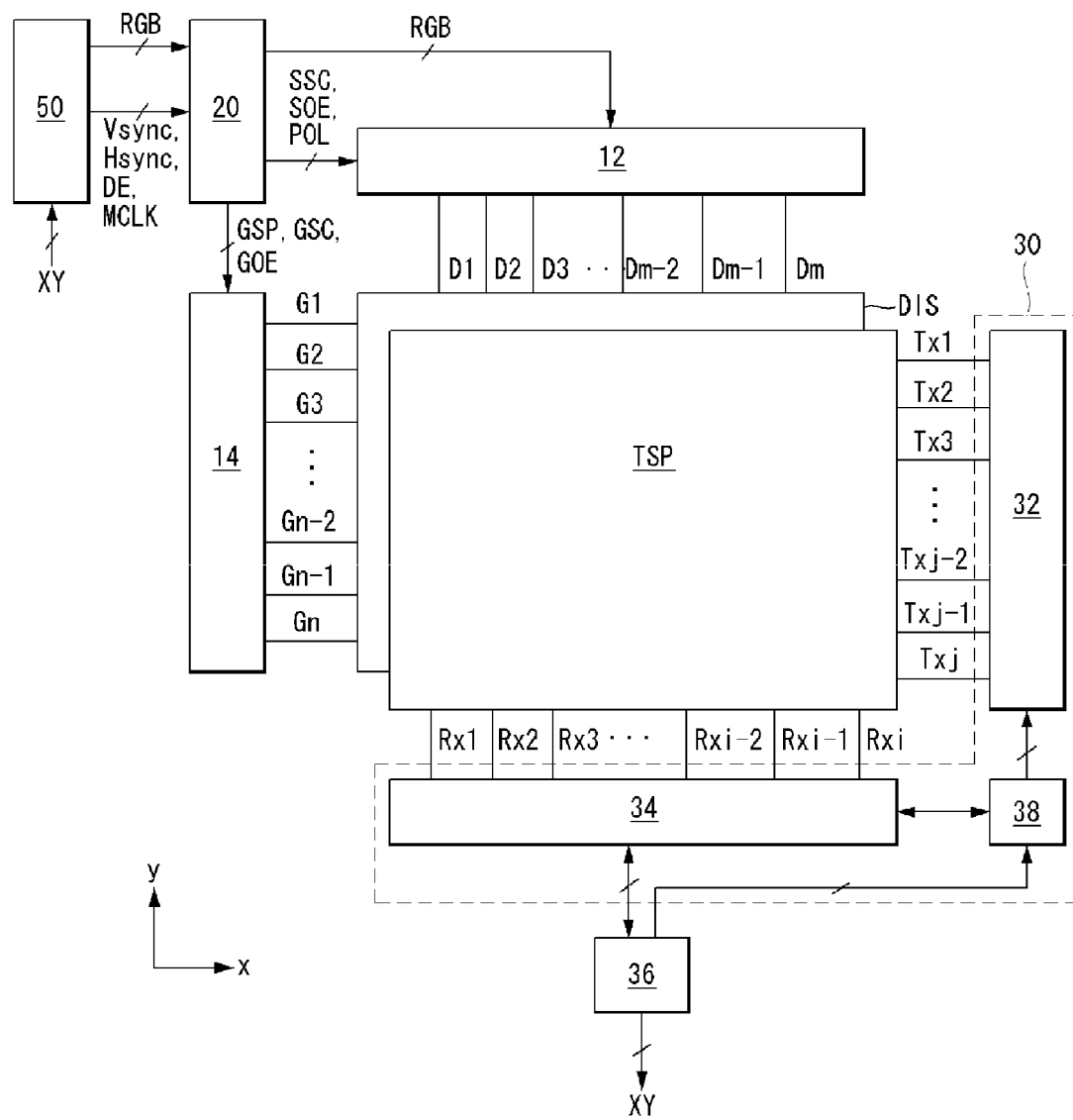
FIG. 1 illustrates a touch sensing system according to an exemplary embodiment of the invention.
Figure 2:
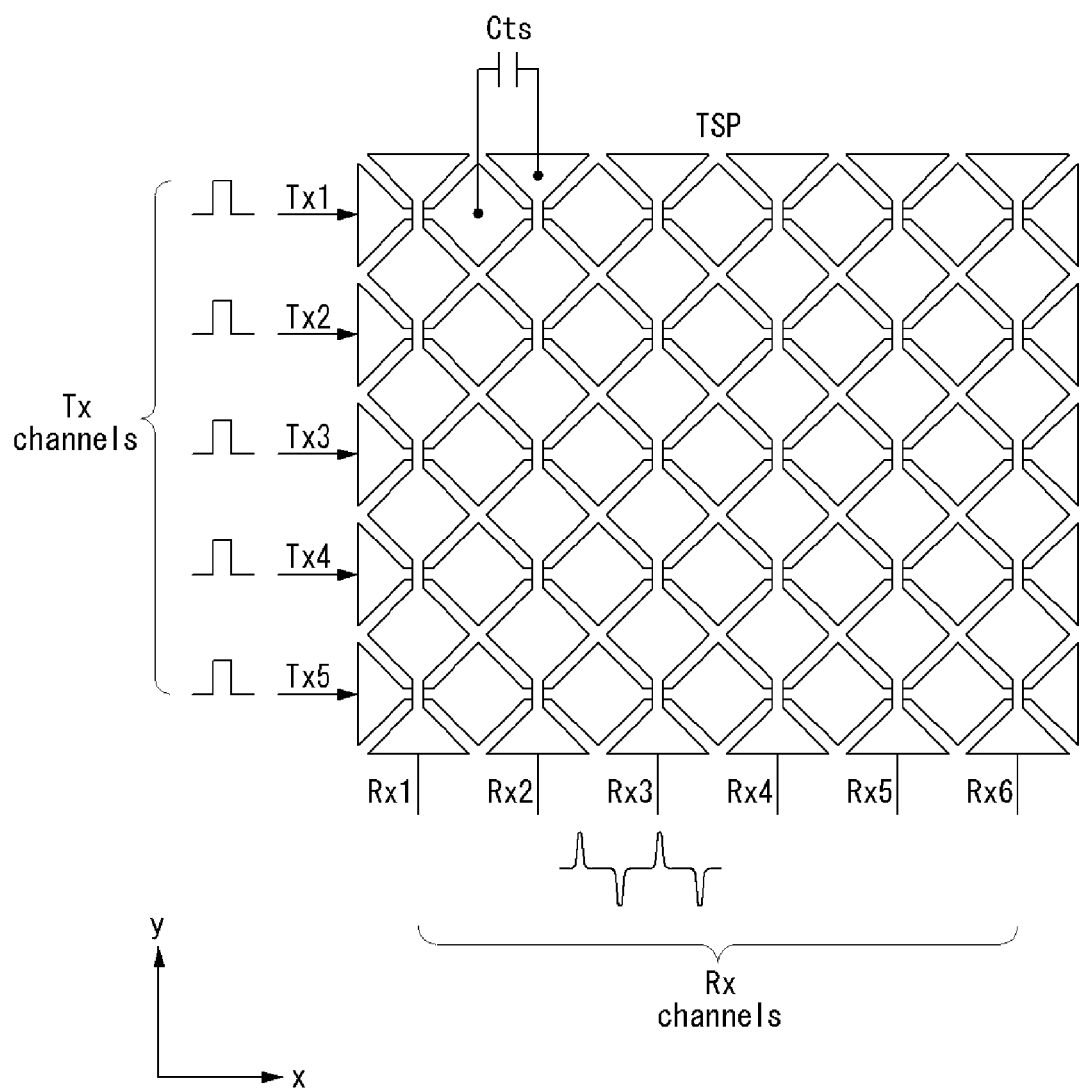
FIG. 2 is an equivalent circuit diagram of a touch screen shown in FIG. 1.
Figure 3:
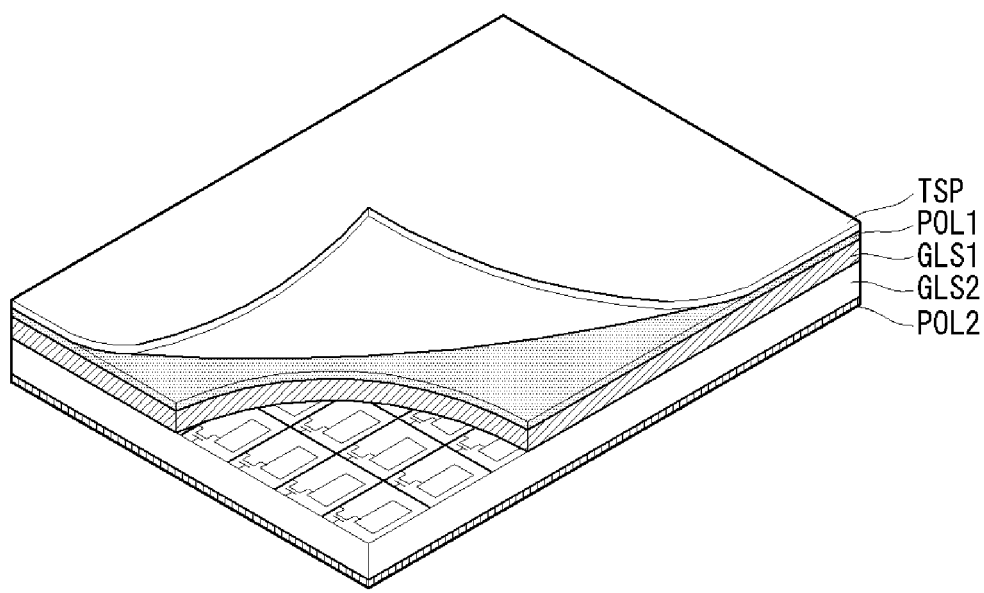
FIGS. 3 to 5 illustrate various combinations of a touch screen and a display panel according to an exemplary embodiment of the invention.
Figure 4:
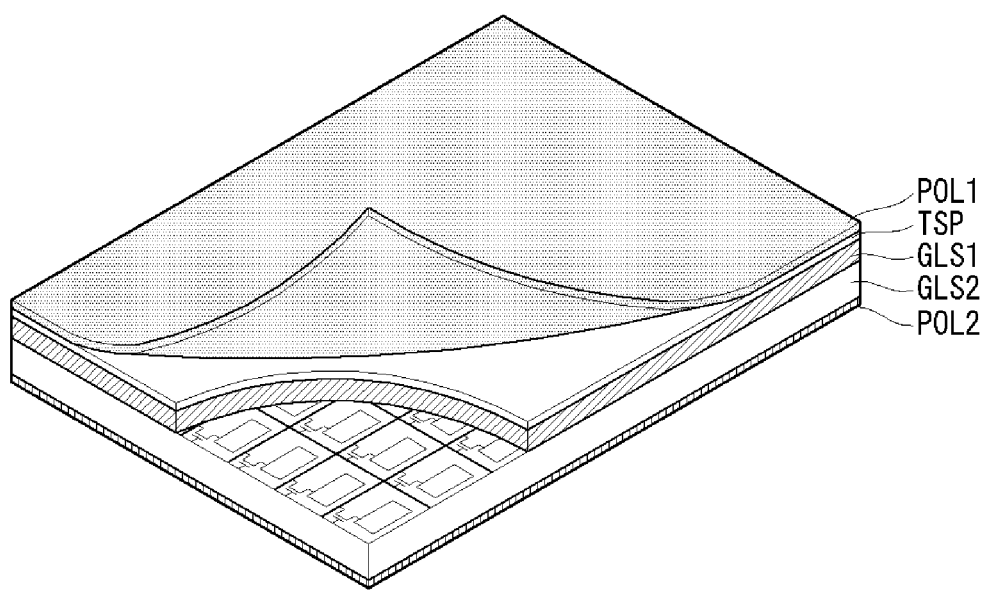
Figure 5:
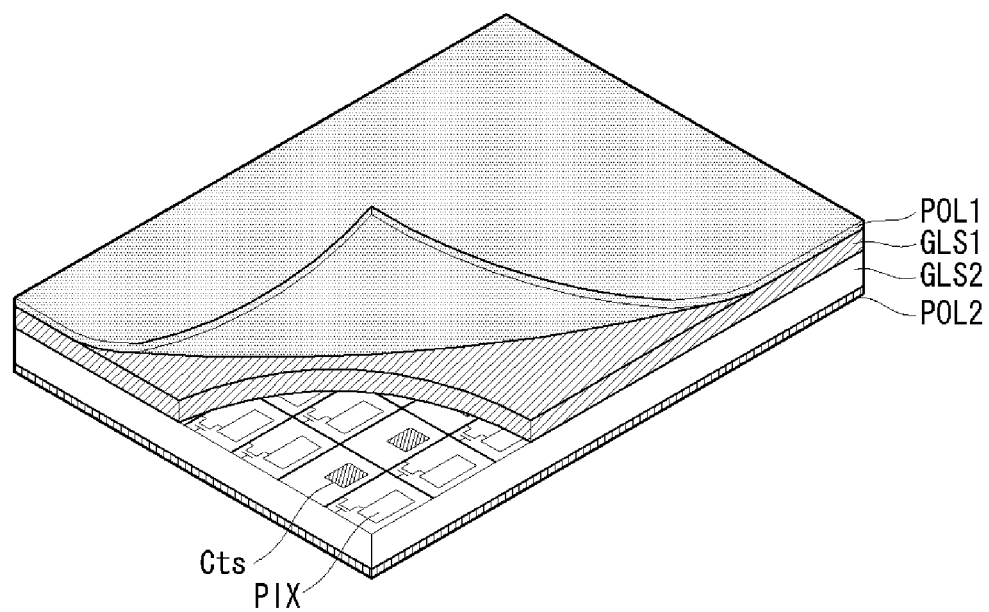

As shown in FIGS. 1 to 5, a touch sensing system according to the embodiment of the invention includes a touch screen TSP including touch sensors Cts, a display driving circuit, a touch screen driving circuit, etc. As shown in FIG. 3, the touch screen TSP may be attached on an upper polarizing plate POL1 of a display panel DIS. Alternatively, as shown in FIG. 4, the touch screen TSP may be formed between the upper polarizing plate POL1 and an upper substrate GLS1 of the display panel DIS. Alternatively, as shown in FIG. 5, the touch sensors Cts of the touch screen TSP may be embedded in a lower substrate GLS2 of the display panel DIS along with a pixel array of the display panel DIS in an in-cell type. In FIGS. 3 to 5, 'PIX' denotes a pixel electrode of a liquid crystal cell, and 'POL2' denotes a lower polarizing plate of the display panel DIS.

The display panel DIS includes a liquid crystal layer formed between the upper substrate GLS1 and the lower substrate GLS2. The pixel array of the display panel DIS includes m×n pixels formed in pixel areas defined by m data lines D1 to Dm and n gate lines (or scan lines) G1 to Gn, where m and n are a positive integer. Each pixel includes thin film transistors (TFTs) formed at crossings of the data lines D1 to Dm and the gate lines G1 to Gn, a pixel electrode charged to a data voltage, a storage capacitor which is connected to the pixel electrode and holds a voltage of the liquid crystal cell, etc. An input image and a touch point are displayed in an active area. The size of the active area may be equal to or less than the size of the pixel array.

Black matrixes, color filters, etc. are formed on the upper substrate GLS1 of the display panel DIS. The lower substrate GLS2 of the display panel DIS may be configured in a COT (color filter on TFT) structure. In this instance, the black matrixes and the color filters may be formed on the lower substrate GLS2 of the display panel DIS. Common electrodes, to which a common voltage is supplied, may be formed on the upper substrate GLS1 or the lower substrate GLS2 of the display panel DIS. The polarizing plates POL1 and POL2 are respectively attached to the upper and lower substrates GLS1 and GLS2 of the display panel DIS. Alignment layers for setting a pre-tilt angle of liquid crystals are respectively formed on the inner surfaces contacting the liquid crystals in the upper and lower substrates GLS1 and GLS2 of the display panel DIS. A column spacer is formed between the upper and lower substrates GLS1 and GLS2 of the display panel DIS to keep cell gaps of the liquid crystal cells constant.

A backlight unit may be disposed under a back surface of the display panel DIS. The backlight unit may be implemented as one of an edge type backlight unit and a direct type backlight unit and provides light to the display panel DIS. The display panel DIS may be implemented in any known mode including a twisted nematic (TN) mode, a vertical alignment (VA) mode, an in-plane switching (IPS) mode, a fringe field switching (FFS) mode, etc.

The display driving circuit includes a data driving circuit 12, a scan driving circuit 14, and a timing controller 20. The display driving circuit applies a video data voltage of the input image to the pixels of the display panel DIS. The data driving circuit 12 converts digital video data RGB received from the timing controller 20 into positive and negative analog gamma compensation voltages and outputs the data voltage. The data driving circuit 12 then supplies the data voltage to the data lines D1 to Dm. The scan driving circuit 14 sequentially supplies a gate pulse (or scan pulse) synchronized with the data voltage to the gate lines G1 to Gn and selects lines of the display panel DIS to which the data voltage will be applied.

The timing controller 20 receives timing signals, such as a vertical sync signal Vsync, a horizontal sync signal Hsync, a data enable signal DE, and a main clock MCLK, from a host system 50. The timing controller 20 generates a data timing control signal and a scan timing control signal for respectively controlling operation timings of the data driving circuit 12 and the scan driving circuit 14 using the timing signals. The data timing control signal includes a source sampling clock SSC, a source output enable signal SOE, a polarity control signal POL, etc. The scan timing control signal includes a gate start pulse GSP, a gate shift clock GSC, a gate output enable signal GOE, etc.

The touch screen TSP includes Tx lines Tx1 to Txj, where T is a positive integer less than 'n', Rx lines Rx1 to Rxi crossing the Tx lines Tx1 to Txj, where T is a positive integer less than 'm', and the i×j touch sensors Cts formed at crossings of the Tx lines Tx1 to Txj and the Rx lines Rx1 to Rxi. Each touch sensor Cts has a mutual capacitance.

The touch screen driving circuit includes a touch sensing circuit 30, an algorithm execution unit 36, etc. The touch screen driving circuit supplies a driving signal to the touch sensors Cts and senses a change amount of charges of the touch sensors Cts. The touch screen driving circuit compares the change amount of the charges with a predetermined threshold value and detects a touch input position. The touch screen driving circuit performs a touch coordinate algorithm and calculates coordinates of the touch input position. The touch screen driving circuit performs a coordinate conversion algorithm and converts the coordinates of the touch input position into coordinates based on a resolution of the display panel. The touch coordinate algorithm and the coordinate conversion algorithm may use any known algorithm. Subsequently, the touch screen driving circuit performs an edge coordinate compensation algorithm and suitably compensates for coordinates positioned outside the active area. In other words, the touch screen driving circuit performs the touch coordinate algorithm, the coordinate conversion algorithm, and the edge coordinate compensation algorithm, thereby converting the coordinates of the touch input position into the coordinates based on the resolution of the display panel. The touch screen driving circuit compensates for the coordinates positioned outside the active area and outputs final coordinates (X, Y). The final coordinates (X, Y) are transmitted to the host system 50. The edge coordinate compensation algorithm is described in detail with reference to FIGS. 6 to 13.

The host system 50 may be implemented as one of a television system, a set-top box, a navigation system, a DVD player, a Blu-ray player, a personal computer (PC), a home theater system, and a phone system. The host system 50 includes a system on chip (SoC), in which a scaler is embedded, and thus converts the digital video data RGB of the input image into a data format suitable for displaying on the display panel DIS. The host system 50 transmits the digital video data RGB and the timing signals Vsync, Hsync, DE, and MCLK to the timing controller 20. Further, the host system 50 runs an application associated with the coordinates (X, Y) received from the touch screen driving circuit.

The touch sensing circuit 30 includes a Tx driver 32, an Rx sensing unit 34, a timing generation unit 38, etc. The touch sensing circuit 30 applies the driving signal to the touch sensors Cts through the Tx lines Tx1 to Txj using the Tx driver 32 and senses the change amount of charges of the touch sensors Cts in synchronization with the driving signal through the Rx lines Rx1 to Rxi and the Rx sensing unit 34, thereby outputting touch raw data. The touch sensing circuit 30 may be integrated into one readout integrated circuit (ROIC).

The Tx driver 32 selects a Tx channel, to which the driving signal will be output, in response to a Tx setup signal from the timing generation unit 38 and applies the driving signal to the Tx lines Tx1 to Txj connected with the selected Tx channel. The Tx lines Tx1 to Txj are charged during a high potential period of the driving signal and supply charges to the touch sensors Cts. The driving signal may be generated in various waveforms including a pulse wave, a sine wave, a triangle wave, etc. The driving signal may be successively supplied to each of the touch sensors Cts N times, so that voltages of the touch sensors Cts can be accumulated on a capacitor of an integrator embedded in the Rx sensing unit 34 through the Rx lines Rx1 to Rxi N times, where N is a positive integer equal to or greater than 2.

The Rx sensing unit 34 selects the Rx lines, which will receive the voltages of the touch sensors Cts, in response to an Rx setup signal from the timing generation unit 38. The Rx sensing unit 34 receives charges of the touch sensors Cts through the Rx lines selected in synchronization with the driving signal. Further, the Rx sensing unit 34 samples the received charges and accumulates the sampled charges on the capacitor of the integrator. The Rx sensing unit 34 converts a voltage of the capacitor into digital data using an analog-to-digital converter (ADC) and outputs the touch raw data which is converted from the digital data.

The timing generation unit 38 controls the settings of the Tx and Rx channels in response to the Tx setup signal and the Rx setup signal from the algorithm execution unit 36 and synchronizes the Tx driver 32 with the Rx sensing unit 34. Further, the timing generation unit 38 stores the touch raw data output from the Rx sensing unit 34 in a buffer memory (not shown) and reads the touch raw data from the buffer memory. The timing generation unit 38 transmits the touch raw data to the algorithm execution unit 36.

The algorithm execution unit 36 supplies the Tx setup signal and the Rx setup signal to the timing generation unit 38 and supplies an ADC clock signal for operating the ADC of the Rx sensing unit 34 to the Rx sensing unit 34. The algorithm execution unit 36 performs the previously determined touch coordinate algorithm and compares the touch raw data received from the touch sensing circuit 30 with a previously determined threshold value. The touch coordinate algorithm decides the touch raw data equal to or greater than the threshold value as data of a touch input area and calculates coordinates of each touch input area. The algorithm execution unit 36 performs the coordinate conversion algorithm and the edge coordinate compensation algorithm and converts the coordinates of the touch input area into coordinates based on the resolution of the display panel DIS, thereby modifying the coordinates of the touch input area positioned outside the active area. The algorithm execution unit 36 may be implemented as a microcontroller unit (MCU).

Figure 6:
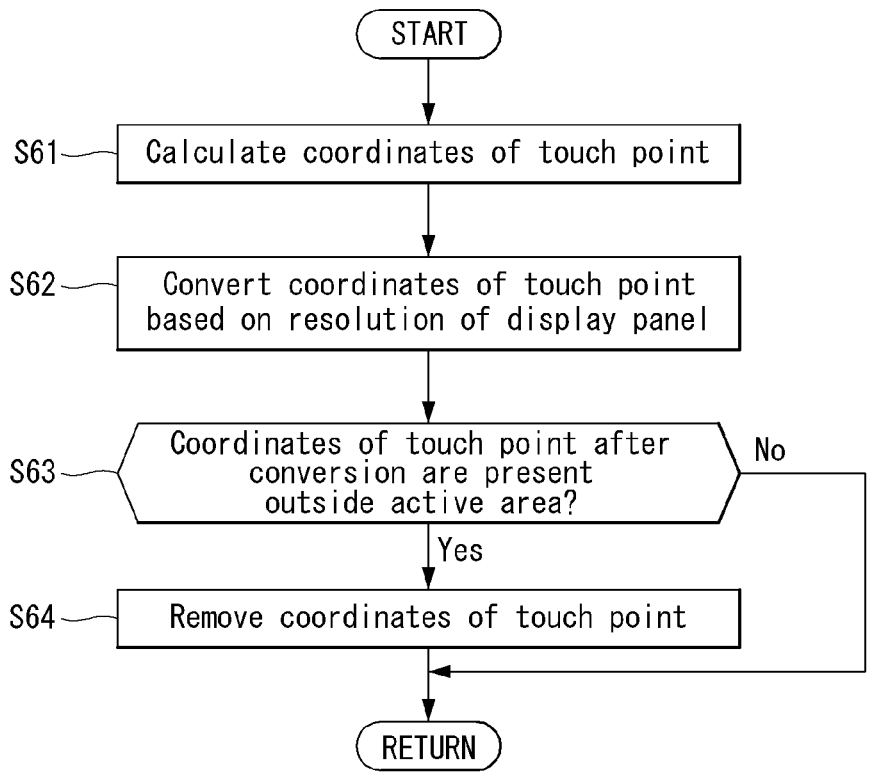
FIG. 6 is a flow chart showing an example of an operation of an algorithm execution unit.

The algorithm execution unit 36 may perform a touch coordinate algorithm S61, a coordinate conversion algorithm S62, and edge coordinate compensation algorithms S63 and S64 in such a way shown in FIG. 6.

The coordinate conversion algorithm S62 suitably converts touch coordinates based on the resolution of the display panel DIS. When a touch input is generated around an edge portion of the touch screen TSP, the coordinate conversion algorithm S62 converts coordinates of a touch point of a touch input position into coordinates based on the resolution of the display panel DIS. In this instance, the coordinates of the touch point after the conversion may be present outside the active area of the display panel DIS. For example, when the resolution of the active area of the display panel DIS is 1366×768, the coordinates of the touch point after the conversion may be present in a bezel area of the left side or the right side of the display panel DIS if x-coordinate in the XY-coordinate system has a negative value less than zero or a value greater than '1366'. Further, if y-coordinate in the XY-coordinate system has a negative value less than zero or a value greater than '768', the coordinates of the touch point after the conversion may be present in the upper side or the lower side of the display panel DIS.

Figure 7:
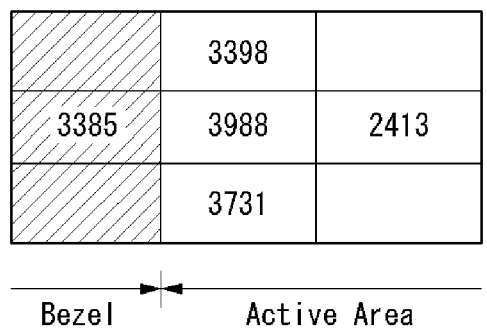
FIG. 7 illustrates an example where coordinates of a touch point have negative values when the coordinates of the touch point are suitably converted based on a resolution of a display panel.

As a result of the execution of the coordinate conversion algorithm S62, an example where the coordinates of the touch point have a negative value is described with reference to FIG. 7. As shown in FIG. 7, when the touch input is generated in the edge portion between the active area AA and the bezel area, touch raw data of a center point of the touch input area may be 3988; touch raw data obtained from the touch sensors adjacent to the center point in a vertical direction may be 3398 and 3731; and touch raw data obtained from the touch sensors positioned around the right side of the center point may be 2413. The coordinate conversion algorithm disclosed in U.S. patent application Ser. No. 13/598,243 (Aug. 29, 2012) corresponding to the present applicant converts coordinates of the center point shown in FIG. 7 into coordinates based on the resolution of the display panel DIS using the following Equations (1) and (2).

$$x = (x_{pattern} + \Delta x) \times N_x + \text{edge\_offset} \qquad (1)$$

In the above Equation (1), 'x' is x-coordinate after the conversion, and '$x_{pattern}$' indicates a turn of the touch sensor from the center point when viewed in the x-axis direction. In FIG. 7, because the center point is the zeroth touch sensor when viewed in the x-axis direction, '$x_{pattern}$' is zero. '$\Delta x$' is an x-coordinate offset and is calculated using the following Equation (2). 'Nx' is a difference between the resolution of the touch screen and the resolution of the display panel when viewed in the x-axis direction, and a distance between the touch sensors Cts, which are adjacent to each other in the x-axis direction, is represented by the number of pixels of the display panel. For example, when 24 pixels are present between the adjacent touch sensors Cts in the x-axis direction, 'Nx' is 24. 'edge_offset' is an edge offset used when the coordinate conversion is generated in the edge portion between the active area and the bezel area. In an example of FIG. 7, 'edge_offset' is set to 16, but is not limited thereto.

$$\Delta x = \frac{\text{right} - \text{left}}{2 \times (\text{center} - \text{left})} \quad (2)$$

In the above Equation (2), 'center' is touch raw data of the touch sensor corresponding to the center point; 'right' is touch raw data (hereinafter, referred to as "right data") of the touch sensor adjacent to the right side of the center point; and 'left' is touch raw data (hereinafter, referred to as "left data") of the touch sensor adjacent to the left side of the center point.

As shown in FIG. 7, when the coordinates of the first touch sensor (i.e., the center point) on the outermost left side of the active area are converted, virtual data is selected as left data because there is no left data, and '$\Delta x$' is calculated. The virtual data may be calculated by an average value of touch raw data of the center point and touch raw data around the center point. If the average value is greater than the right data, '$\Delta x$' calculated after the conversion may have a negative value. In the example of FIG. 7, the average value is 3385 (=(3998+3731+3398+2413)/4), and the average value '3385' is substituted for Equation (2) to get $\Delta x$ of about '−0.8'. $\Delta x$ of about '−0.8' is substituted for Equation (1) to get the x-coordinate 'x' of '−3.2' (=(0+(−0.8))×24+16).

Figure 8:
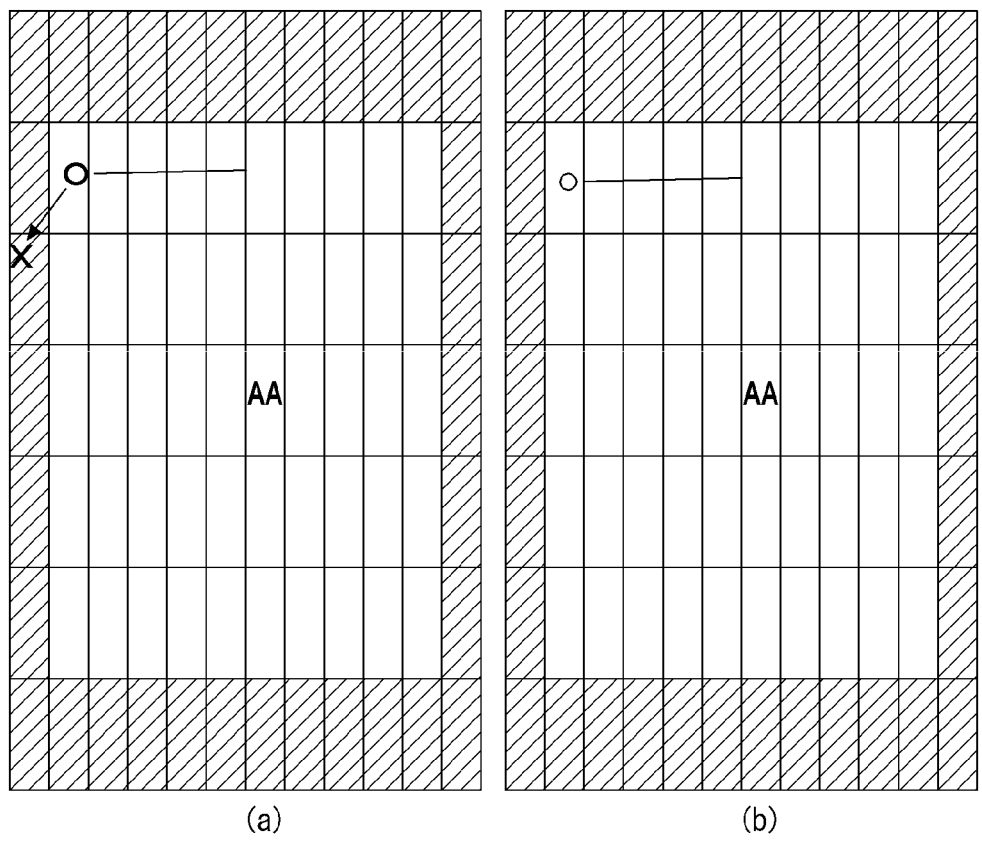
FIG. 8 illustrates an example of removing coordinates of a touch point positioned outside an active area in FIG. 6.
Figure 8:
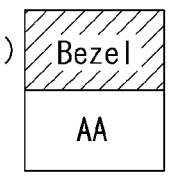

In FIG. 6, the edge coordinate compensation algorithms S63 and S64 check whether the coordinates of the touch point are absent or present outside the active area AA. FIG. 8 illustrates a result of the execution of the edge coordinate compensation algorithm S63. As shown in FIG. 8, as the result of the execution of the coordinate conversion algorithm S62, the coordinates of the touch point were changed from (x1, y1) in a previous frame period to (x2, y2) in a current frame period. As shown in (a) of FIG. 8, the touch point coordinates (x2, y2) in the current frame period are coordinates inside the left bezel area. In this instance, as shown in (b) of FIG. 8, the edge coordinate compensation algorithms S63 and S64 shown in FIG. 6 remove coordinates inside the bezel area outside the active area. However, the edge coordinate compensation algorithms S63 and S64 make it impossible to perform the touch recognition in the edge portion between the active area and the bezel area. In particular, when the touch sensor is added to the bezel area so as to make it possible to perform the touch recognition in the edge portion, the coordinates converted by the coordinate conversion algorithm are frequently converted into coordinates of the bezel area. Therefore, the method for simply removing the coordinates of the edge portion results in a reduction in the touch sensitivity. Thus, the edge coordinate compensation algorithm according to the embodiment of the invention not removes but modifies the coordinates positioned outside the active area as shown in FIGS. 9 to 13.

Figure 9:
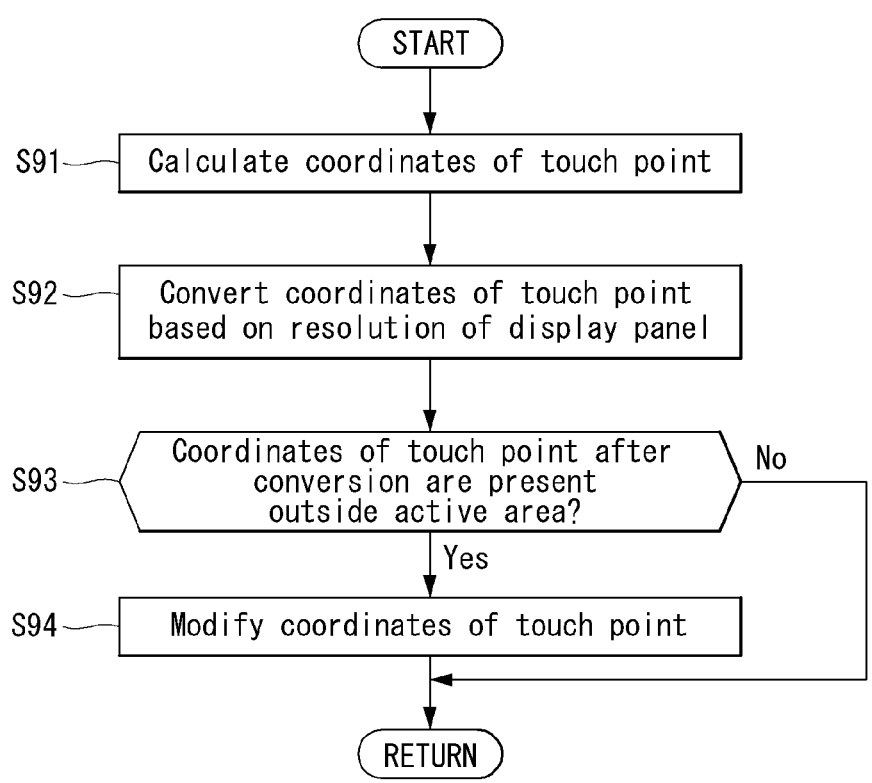
FIG. 9 is a flow chart showing an operation of an algorithm execution unit according to an exemplary embodiment of the invention.
Figure 10:
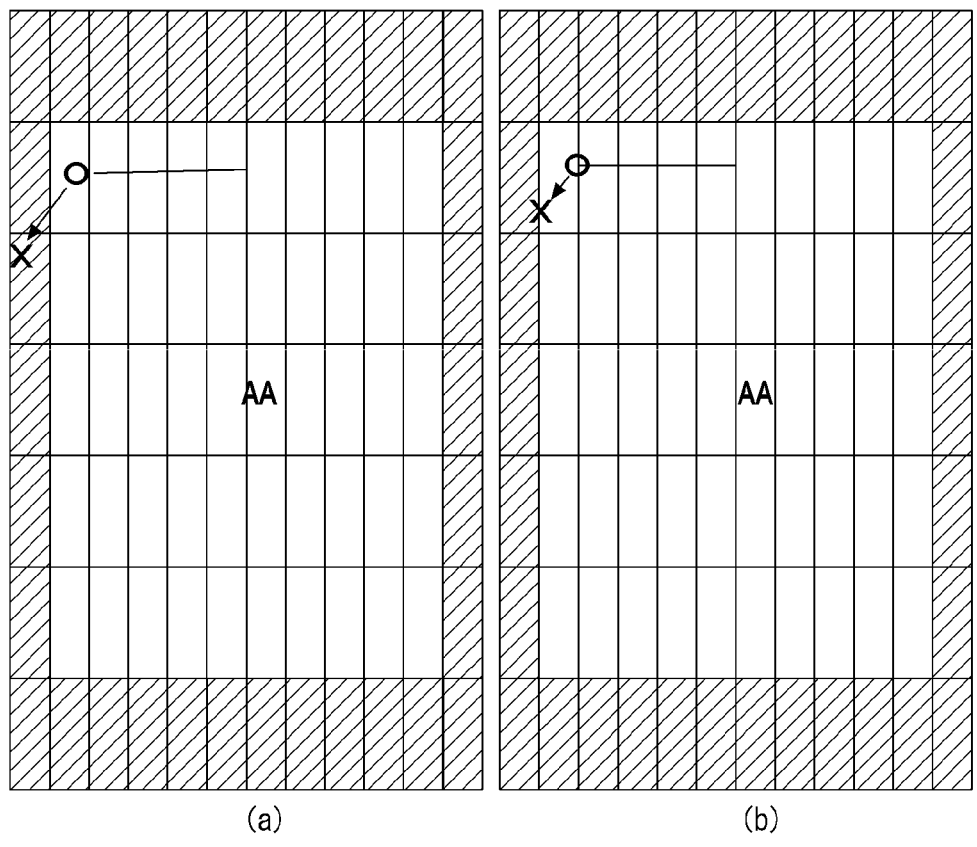
FIG. 10 illustrates an example where coordinates of a touch point are modified into edge coordinates of an active area when the coordinates of the touch point are suitably converted based on a resolution of a display panel.
Figure 10:
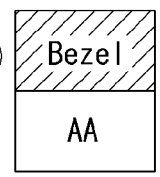
Figure 11:
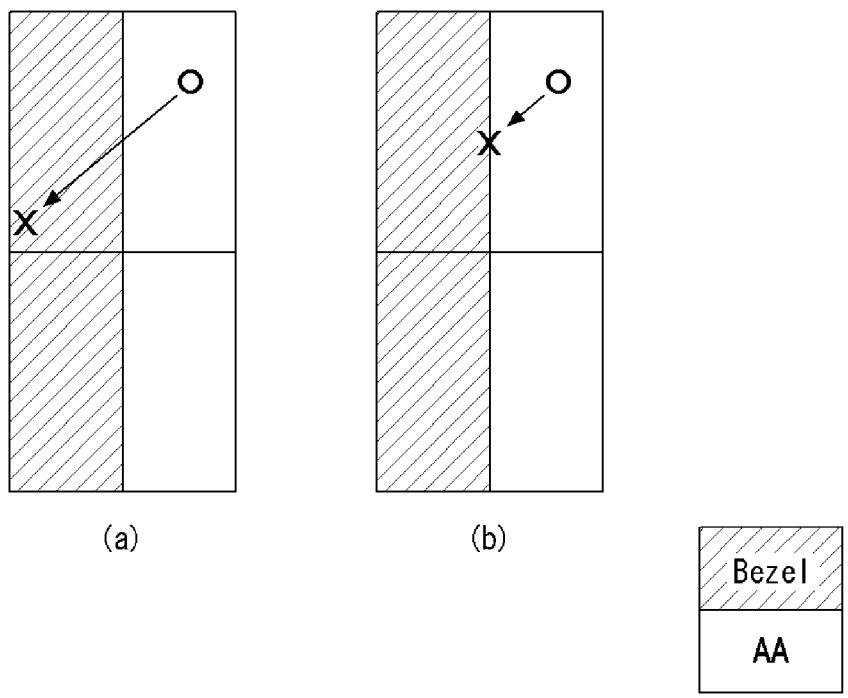
FIG. 11 enlargedly shows a moving portion of a touch point in FIG. 10.

FIG. 9 is a flow chart showing an operation of the algorithm execution unit 36 according to the embodiment of the invention. FIG. 10 illustrates an example where the coordinates of the touch point are modified into edge coordinates of the active area when the coordinates of the touch point are suitably converted based on the resolution of the display panel. FIG. 11 enlargedly shows a moving portion of the touch point shown in FIG. 10.

As shown in FIGS. 9 to 11, the algorithm execution unit 36 performs a touch coordinate algorithm S91, a coordinate conversion algorithm S92, and edge coordinate compensation algorithms S93 and S94.

The coordinate conversion algorithm S92 suitably converts coordinates of a touch point based on the resolution of the display panel DIS. The edge coordinate compensation algorithms S93 and S94 search coordinates positioned outside the active area AA among the coordinates of the touch point converted by the coordinate conversion algorithm S92. As shown in FIGS. 10 and 11, when the touch point moving from the active area AA to the bezel area is searched, the edge coordinate compensation algorithms S93 and S94 modify current frame coordinates (x2, y2) of the touch point into edge coordinates (x3, y3) of the active area AA on a shortest path between the current frame coordinates (x2, y2) and previous frame coordinates (x1, y1).

As shown in FIGS. 10 to 13, when the touch point moves from the previous frame coordinates (x1, y1) of the active area AA to the current frame coordinates (x2, y2) of the left bezel area, the edge coordinate compensation algorithms S93 and S94 modify the x-coordinate of the current frame coordinates (x2, y2) into zero. Further, the edge coordinate compensation algorithms S93 and S94 modify the y-coordinate of the current frame coordinates (x2, y2) into a left edge coordinate of the active area AA on the shortest path between the current frame coordinates (x2, y2) and the previous frame coordinates (x1, y1).

When the touch point moves from the previous frame coordinates (x1, y1) of the active area AA to the current frame coordinates (x2, y2) of the right bezel area, the edge coordinate compensation algorithms S93 and S94 modify the x-coordinate of the current frame coordinates (x2, y2) into a maximum x-coordinate of the active area AA. Further, the edge coordinate compensation algorithms S93 and S94 modify the y-coordinate of the current frame coordinates (x2, y2) into a right edge coordinate of the active area AA on the shortest path between the current frame coordinates (x2, y2) and the previous frame coordinates (x1, y1).

When the touch point moves from the previous frame coordinates (x1, y1) of the active area AA to the current frame coordinates (x2, y2) of the upper bezel area, the edge coordinate compensation algorithms S93 and S94 modify the y-coordinate of the current frame coordinates (x2, y2) into zero. Further, the edge coordinate compensation algorithms S93 and S94 modify the x-coordinate of the current frame coordinates (x2, y2) into an upper edge coordinate of the active area AA on the shortest path between the current frame coordinates (x2, y2) and the previous frame coordinates (x1, y1).

When the touch point moves from the previous frame coordinates (x1, y1) of the active area AA to the current frame coordinates (x2, y2) of the lower bezel area, the edge coordinate compensation algorithms S93 and S94 modify the y-coordinate of the current frame coordinates (x2, y2) into a maximum y-coordinate of the active area AA. Further, the edge coordinate compensation algorithms S93 and S94 modify the x-coordinate of the current frame coordinates (x2, y2) into a lower edge coordinate of the active area AA on the shortest path between the current frame coordinates (x2, y2) and the previous frame coordinates (x1, y1).

FIGS. 10 and 11 illustrate a result of the execution of the edge coordinate compensation algorithms S93 and S94 shown in FIG. 9. As shown in (a) of FIG. 10 and (a) of FIG. 11, as a result of the execution of the coordinate conversion algorithm S92, the coordinates of the touch point were changed from the coordinates (x1, y1) of the active area AA in a previous frame period to the coordinates (x2, y2) of the bezel area in a current frame period. In this instance, as shown in (b) of FIG. 10 and (b) of FIG. 11, the edge coordinate compensation algorithms S93 and S94 shown in FIG. 9 modify the coordinates (x2, y2) of the bezel area outside the active area AA into edge coordinates of the active area contacting the bezel area on the shortest path between the previous coordinates and the current coordinates using a proportional expression of the previous coordinates and the current coordinates.

Figure 12:
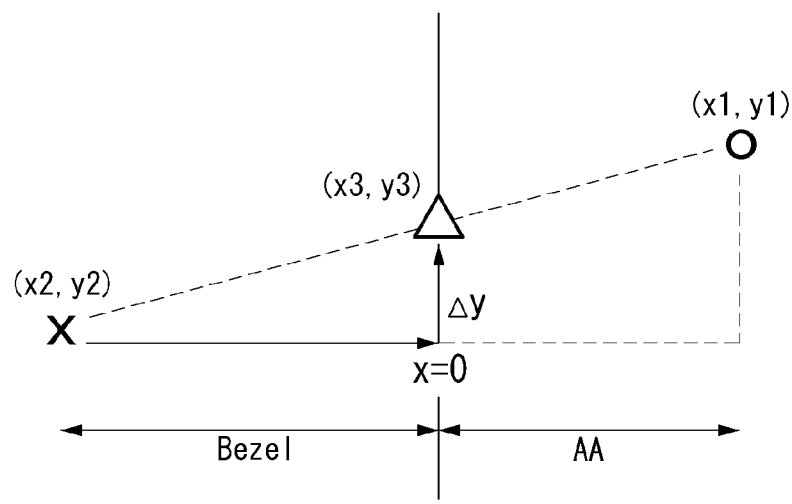
FIGS. 12 and 13 illustrate a coordinate compensation principle of an edge coordinate compensation algorithm shown in FIG. 9.
Figure 13:
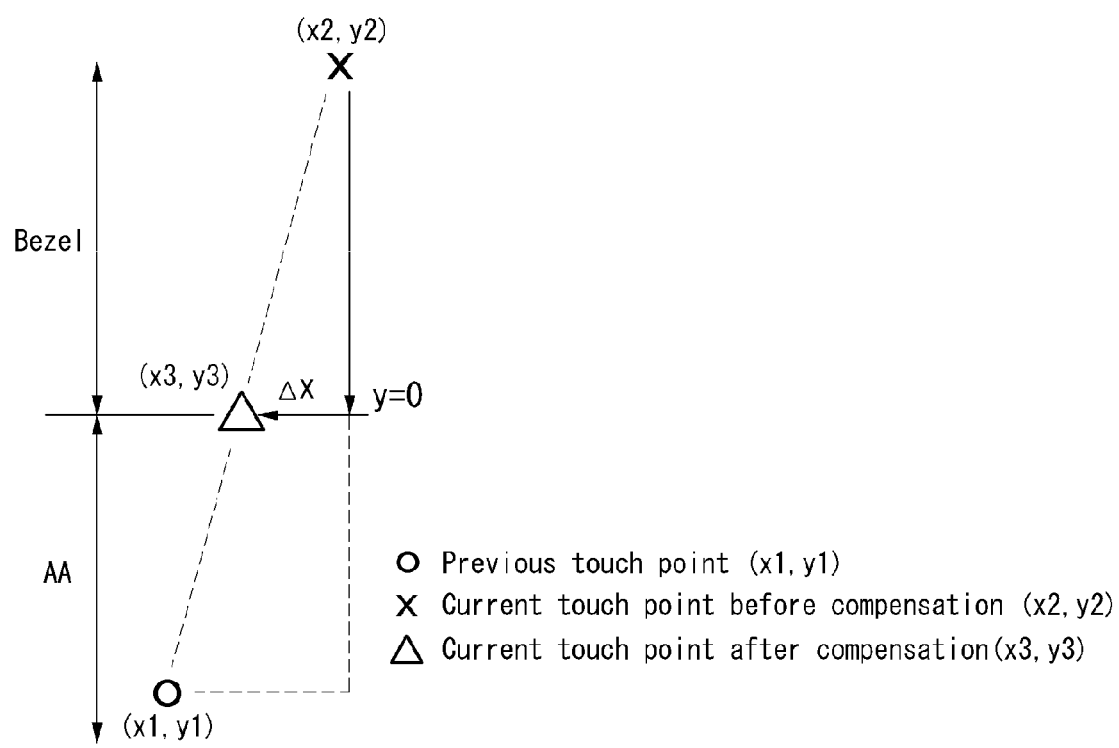

FIGS. 12 and 13 illustrate a coordinate compensation principle of the edge coordinate compensation algorithms S93 and S94. FIG. 12 illustrates a principle of modifying coordinates of the left bezel contacting the left edge of the active area AA into left edge coordinates of the active area AA as shown in FIGS. 10 and 11. FIG. 13 illustrates a principle of modifying coordinates of the upper bezel contacting the upper edge of the active area AA into upper edge coordinates of the active area AA.

When the touch point moves from the coordinates (x1, y1) of the active area AA in the previous frame period to the coordinates (x2, y2) of the left bezel area in the current frame period, the edge coordinate compensation algorithms S93 and S94 modify the x-coordinate x3, which will be modified, into zero and then modify the y-coordinate y3, which will be modified, into left edge coordinates of the active area AA on the shortest path between the previous frame coordinates (x1, y1) and the current frame coordinates (x2, y2) using a proportional expression of the previous frame coordinates (x1, y1) and the current frame coordinates (x2, y2) as indicated by the following Equation (3) and FIG. 12.

$$(x1-x2):(y1-y2)=x2:\Delta y \quad (3)$$

$\Delta y$ shown in FIG. 12 is calculated as $$\Delta y = \frac{(y1-y2)}{(x1-x2)} \times x2$$

through Equation (3), and thus the y-coordinate y3, which will be modified, is calculated as $$y3 = \frac{(y1-y2)}{(x1-x2)} \times x2 + y2.$$

An example of FIG. 12 shows that the x-coordinate of the current frame in the XY-coordinate system has a negative value less than zero. The fact that the x-coordinate of the current frame is greater than the maximum x-coordinate of the active area indicates that the coordinates of the touch point in the current frame period are present in the right bezel area. In this instance, the edge coordinate compensation algorithms S93 and S94 modify the x-coordinate x3, which will be modified, into the maximum x-coordinate of the active area and calculate the y-coordinate y3, which will be modified, using the proportional expression indicated in Equation (3), thereby modifying the coordinates of the right bezel area into right edge coordinates of the active area AA.

As shown in FIG. 13, when the touch point moves from the coordinates (x1, y1) of the active area AA in the previous frame period to the coordinates (x2, y2) of the upper bezel area in the current frame period, the edge coordinate compensation algorithms S93 and S94 modify the y-coordinate y3, which will be modified, into zero and then modify the x-coordinate x3, which will be modified, into upper edge coordinates of the active area AA on the shortest path between the previous frame coordinates (x1, y1) and the current frame coordinates (x2, y2) using a proportional expression of the previous frame coordinates (x1, y1) and the current frame coordinates (x2, y2) as indicated by the following Equation (4) and FIG. 13.

$$(x1-x2):(y1-y2)=\Delta x:y2 \quad (4)$$

$\Delta x$ shown in FIG. 13 is calculated as $$\Delta x = \frac{(x1-x2)}{(y1-y2)} \times y2$$

through Equation (4), and thus the x-coordinate x3, which will be modified, is calculated as $$x3 = \frac{(x1-x2)}{(y1-2)} \times y2 + x2.$$

An example of FIG. 13 shows that the y-coordinate of the current frame in the XY-coordinate system has a negative value less than zero. The fact that the y-coordinate of the current frame is greater than the maximum y-coordinate of the active area indicates that the coordinates of the touch point in the current frame period are present in the lower bezel area. In this instance, the edge coordinate compensation algorithms S93 and S94 modify the y-coordinate y3, which will be modified, into the maximum y-coordinate of the active area and calculate the x-coordinate x3, which will be modified, using the proportional expression indicated in Equation (4), thereby modifying the coordinates of the lower bezel area into lower edge coordinates of the active area AA.

As described above, the embodiment of the invention suitably converts the coordinates of the touch point based on the resolution of the display panel, and then modifies the converted coordinates of the touch point into the edge coordinates of the active area contacting the bezel area when the converted coordinates of the touch point are present outside the active area displaying the image. As a result, the embodiment of the invention may perform the touch recognition in the maximum size of the active area and may improve the touch sensitivity the user feels. Further, when the user performs the line drawing through the touch input, the embodiment of the invention may reproduce the line drawing similar to the drawing, the user really inputs, through a drawing trace of the line drawing.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of compensating for coordinates of an edge portion of a touch sensing system, comprising:
    calculating a coordinate of a touch point corresponding to a touch input generated in the edge portion between an active area of the display panel and an bezel area outside the active area, an image being displayed in the active area of the display panel;

suitably converting the coordinate of the touch point based on a resolution of the display panel;

deciding whether or not a current coordinate of the touch point is present in the bezel area; and when the current coordinate of the touch point is present in the bezel area, modifying the current coordinate of the touch point into an edge coordinate of the active area, wherein the edge coordinate of the active area contacts the bezel area and is on a shortest path between the current coordinate and a previous coordinate of the touch point, the previous coordinate of the touch point corresponding to a touch input generated inside the active area of the display panel.

2. The method of claim 1, wherein the modifying of the current coordinate of the touch point into the edge coordinate of the active area when the current coordinate of the touch point is present in the bezel area includes when the touch point moves from the previous coordinate of the active area to a current coordinate of a left bezel area, modifying an x-coordinate of the current coordinate into zero and modifying a y-coordinate of the current coordinate into a left edge coordinate of the active area on the shortest path between the current coordinate and the previous coordinate of the touch point.

3. The method of claim 1, wherein the modifying of the current coordinate of the touch point into the edge coordinate of the active area when the current coordinate of the touch point is present in the bezel area includes when the touch point moves from the previous coordinate of the active area to a current coordinate of a right bezel area, modifying an x-coordinate of the current coordinate into a maximum x-coordinate of the active area and modifying a y-coordinate of the current coordinate into a right edge coordinate of the active area on the shortest path between the current coordinate and the previous coordinate of the touch point.

4. The method of claim 1, wherein the modifying of the current coordinate of the touch point into the edge coordinate of the active area when the current coordinate of the touch point is present in the bezel area includes when the touch point moves from the previous coordinate of the active area to a current coordinate of an upper bezel area, modifying a y-coordinate of the current coordinate into zero and modifying an x-coordinate of the current coordinate into an upper edge coordinate of the active area on the shortest path between the current coordinate and the previous coordinate of the touch point.

5. The method of claim 1, wherein the modifying of the current coordinate of the touch point into the edge coordinate of the active area when the current coordinate of the touch point is present in the bezel area includes when the touch point moves from the previous coordinate of the active area to a current coordinate of a lower bezel area, modifying a y-coordinate of the current coordinate into a maximum y-coordinate of the active area and modifying an x-coordinate of the current coordinate into a lower edge coordinate of the active area on the shortest path between the current coordinate and the previous coordinate of the touch point.

* * * * *